United States Patent
Lewis et al.

(10) Patent No.: US 7,062,563 B1
(45) Date of Patent: Jun. 13, 2006

(54) METHOD AND SYSTEM FOR IMPLEMENTING CURRENT USER LINKS

(75) Inventors: Nina Lewis, San Mateo, CA (US); John Bellemore, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 750 days.

(21) Appl. No.: 10/084,881

(22) Filed: Feb. 27, 2002

Related U.S. Application Data

(60) Provisional application No. 60/272,521, filed on Feb. 28, 2001.

(51) Int. Cl.
*G06F 15/16* (2006.01)

(52) U.S. Cl. ...................... 709/227; 709/229; 709/228; 713/167

(58) Field of Classification Search .............. 707/9; 709/219, 227–229; 713/167
See application file for complete search history.

(56) References Cited

U.S. PATENT DOCUMENTS

| | | | |
|---|---|---|---|
| 5,450,581 A | 9/1995 | Bergen et al. | |
| 5,684,951 A | 11/1997 | Goldman et al. | |
| 5,708,812 A * | 1/1998 | Van Dyke et al. | 717/171 |
| 5,768,519 A * | 6/1998 | Swift et al. | 709/223 |
| 5,884,316 A | 3/1999 | Bernstein et al. | |
| 5,899,987 A | 5/1999 | Yarom | |
| 6,119,230 A * | 9/2000 | Carter | 713/200 |
| 6,145,086 A | 11/2000 | Bellemore et al. | |
| 6,158,010 A | 12/2000 | Moriconi et al. | |
| 6,178,511 B1 | 1/2001 | Cohen et al. | |
| 6,192,130 B1 * | 2/2001 | Otway | 380/277 |
| 6,240,512 B1 | 5/2001 | Fang et al. | |
| 6,243,816 B1 | 6/2001 | Fang et al. | |
| 6,253,216 B1 | 6/2001 | Sutcliffe et al. | |
| 6,275,944 B1 | 8/2001 | Kao et al. | |
| 6,289,462 B1 | 9/2001 | McNabb et al. | |
| 6,321,259 B1 | 11/2001 | Ouellette et al. | |
| 6,339,423 B1 * | 1/2002 | Sampson et al. | 715/854 |
| 6,377,950 B1 | 4/2002 | Peters et al. | |
| 6,385,724 B1 * | 5/2002 | Beckman et al. | 713/167 |
| 6,490,591 B1 | 12/2002 | Denbar et al. | |
| 8,507,817 | 1/2003 | Wolfe et al. | |
| 6,535,879 B1 | 3/2003 | Behera | |

(Continued)

OTHER PUBLICATIONS

Oracle8 Server Concepts, "Privileges and Roles", Release 8.0, vol. 2, Jun. 1997, pp. 25-1 through 25-15.

(Continued)

*Primary Examiner*—Rupal Dharia
*Assistant Examiner*—Chirag R. Patel
(74) *Attorney, Agent, or Firm*—Bingham McCutchen LLP

(57) ABSTRACT

A method and system for managing access information for users and other entities in a distributed computing system is disclosed. An aspect of the invention relates to current user links between a first computing node and a second computing node. Objects are created/maintained to identify allowable links between computing nodes. Objects can also be created/maintained to store identification of chains of links. The current user link allows access for a user from the first computing node to the second computing node without user authentication by the second computing node. This can be implemented using trust relationships between the first and second computing nodes. Transitive aspects of the trust relationships can be handled by accessing information about chains of users/nodes. In addition, trust relationships can be administered by a local computing node.

50 Claims, 11 Drawing Sheets

U.S. PATENT DOCUMENTS

| | | | |
|---|---|---|---|
| 6,556,995 | B1 | 4/2003 | Child et al. |
| 6,651,168 | B1 | 11/2003 | Kao et al. |
| 6,678,682 | B1 | 1/2004 | Jenkins et al. |
| 6,768,988 | B1 | 7/2004 | Boreham et al. |
| 2002/0007346 | A1* | 1/2002 | Qiu et al. ............... 705/50 |
| 2002/0026592 | A1 | 2/2002 | Gavrila et al. |
| 2002/0069223 | A1* | 6/2002 | Goodisman et al. ........ 707/513 |
| 2002/0078004 | A1* | 6/2002 | Ambrosini et al. ............ 707/1 |
| 2002/0082818 | A1 | 6/2002 | Ferguson et al. |
| 2002/0083073 | A1 | 6/2002 | Vaidya et al. |
| 2003/0195888 | A1* | 10/2003 | Croft et al. ................. 707/10 |

OTHER PUBLICATIONS

Bertino, E. et al. "Controlled Access and Dissemination of XML Documents" *Proceedings of the 2nd International Workshop on Web Information and Date Management* (Nov. 1999) pp. 22-27.

Bertino, E. et al. "On Specifying Security Policies for Web Documents with an XML-Based Language" *Proceedings of the 6th ACM Symposium on Access Control Models and Technologies* (May 2001) pp. 57-65.

Bonczek, R.H. et al. "A Transformational Grammar-Based Query Processor for Access Control in a Planning System" *ACM Transactions on Database Systems (TODS)* (Dec. 1977) 2(4):326-338.

Castano, S. et al. "A New Approach to Security System Development" *Proceedings of the 1994 Workshop on New Security Paradigms* (Aug. 1994) pp. 82-88.

Gladney, H.M. "Access Control for Large Collections" *ACM Transactions on Information Systems (TOIS)* (Apr. 1997) 15(2):154-194.

Hsiao, D.K. "A Software Engineering Experience in the Management, Design and Implementation of a Data Secure System" *Proceedings of the 2nd International Conference on Software Engineering* (Oct. 1976) pp. 532-538.

Myers, A.C. and B. Liskov "Protecting Privacy Using the Decentralized Label Model" *ACM Transactions on Software Engineering and Methodology* (Oct. 2000) 9(4):410-442.

Sandhu, R.S. "The Schematic Protection Model: Its Definition and Analysis for Acyclic Attenuating Schemes" *Journal of the Association of Computing Machinery (JACM)* (Apr. 1988) 35(2):404-432.

Sion, R. et al. "Data Security and Protection: Rights Protection for Relational Data" *Proceedings of the 2003 ACM SIGMOD International Conference on Management of Date* (Jun. 2003) pp. 98-109.

Weede, H.F. and M. Lischka "Role-Based Access Control in Ambient and Remote Space" *Proceedings of the 9th ACM Symposium on Access Control Models and Technologies* (Jun. 2004) pp. 21-30.

* cited by examiner

METHOD AND SYSTEM FOR IMPLEMENTING CURRENT USER LINKS

CROSS-REFERENCE TO RELATED APPLICATIONS

Priority is claimed to U.S. Provisional Application 60/272,521, filed Feb. 28, 2001, which is hereby incorporated by reference in its entirety.

BACKGROUND AND SUMMARY

The invention relates to computer systems, and more particularly, to a method and mechanism for managing access information in a distributed computing environment, such as a distributed database environment. Some of the tasks faced by an enterprise in managing user access and privileges include managing information about users, keeping user information current, and securing access to all the information in an enterprise. These tasks have become complex because of the increased use of technology and high user turnover in many enterprises. In addition, these tasks are also made more complex because each user may have multiple accounts and/or passwords on different network nodes. These numerous accounts are often in addition to any other operating systems based accounts possessed by the user. The effort of managing all this user information in numerous user accounts, which often contains duplicative information, leads to increased maintenance costs and decreased efficiencies.

Furthermore, the distributed nature of managing multiple user accounts leads to increased security risks. For example, whenever a user leaves a company or changes jobs, the user's account status and privileges should be changed the same day in order to guard against misuse of that user's accounts and privileges. However, in a large enterprise with numerous user accounts and passwords distributed over multiple databases, an administrator may not be able to make the timely changes required by good security practices.

Requiring a user to maintain multiple accounts on different network nodes may also create increased security risks. For example, if the user must maintain a password for each account, then the user is likely to use the same password for each of the distributed accounts. This creates a security risk since this same password information now exists in multiple account locations and the breach of that password security at one location creates a security problem at all locations, which is particularly troubling if some of the account locations have lower security precautions in place than other locations.

Accordingly, the present invention provides an improved method and system for managing access information for users and other entities in a distributed computing system. In an embodiment of the present invention, information relating to user access (e.g., name, authentication information, and user roles) is stored in a centralized directory. When the user connects to the database, the database looks up the necessary information about the user in the directory. In an embodiment, the present invention addresses the user, administrative, and security challenges described above by centralizing storage and management of user-related information in an LDAP-compliant directory service. When an employee changes jobs in such an environment, the administrator need only modify information in one location—the directory—to make effective changes in multiple databases and systems. This centralization lowers administrative costs and improves enterprise security.

An aspect of one embodiment of the invention relates to current user links between a first computing node and a second computing node. According to one embodiment, trusted relationships are implemented between database servers to allow user links. One approach to identify trusted relationships is to implement trust flags that indicate whether other computing nodes should be trusted. In one embodiment, a current user link allows access for a user from the first computing node to the second computing node without user authentication by the second computing node. Transitive aspects of the trust relationships can be managed by accessing "chains" of user/server information. Trust relationships can be administered by a local computing node. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is directed to a method and mechanism for centralized management of access information in a computing system. Specific orderings and combinations of process actions and system components are described herein to illustrate the invention. It will, however, be evident that various modifications and changes may be made without departing from the spirit and scope of the invention. For example, the following explanation of the invention is made with respect to a distributed system comprising database nodes (also referred to as database servers or databases). However, the inventive concepts disclosed herein may be equally applied to other types of computing nodes. Thus, the specification and drawings are to be regarded in an illustrative rather than restrictive sense.

Overview

Figure 1:
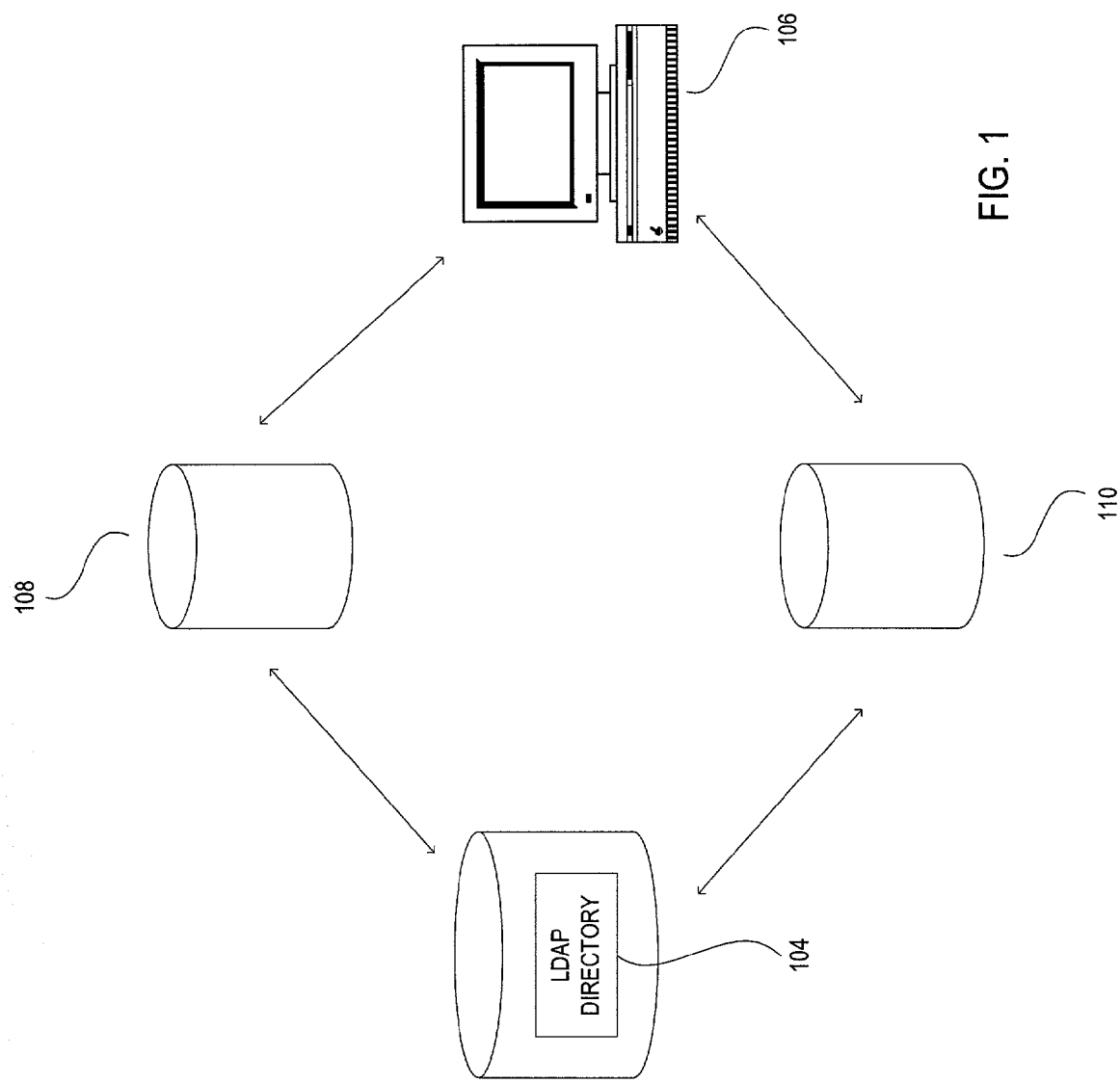
FIG. 1 depicts an architecture for storing user information according to an embodiment of the invention.

FIG. 1 shows a system for managing user and access information according to an embodiment of the invention. User access and privilege information are stored in a centralized directory information system 104, which in an embodiment comprises a LDAP directory. When a user at computer access device 106 seeks to access a first database 108 or a second database 110, "authentication" information is communicated from access device 106 to the respective database for which access is sought. Authentication refers to the process of verifying that a user is who he claims to be. This may be accomplished, for example, by requiring the user to provide a valid password associated with the user's identification or by supplying a digital certificate that validates the user's identity. The centralized directory information system 104 maintains current authentication information for authorized users of the computing system. For example, the current password and/or digital certificate validation data for users are stored at the directory information system 104. The centralized directory information system 104 communicates with each database 108 and 110 to authenticate users that seek to access any of the databases serviced by the centralized directory information system 104. Alternatively, user authentication information is stored for verification at each database 108 or 110 for which access is sought or at the client 106.

The directory information system 104 also maintains "authorization" information for each user. Authorization generally refers to the scope of privileges and roles assigned to a given user. Once a user has been successfully authenticated that user's authorization information is sent to the database for which access is sought. The authorization information determines the scope of access that is granted to the user.

Authorization and/or authentication information for users in the distributed computer system can be centrally stored and maintained in the directory information system 104. Hence, each individual database 108 and 110 is not required to locally maintain user account and access information. However, the present invention permits each local database to customize and define the exact amount, level, and scope of access that a user has in the local database based upon the centrally stored user authorization information. In effect, the present invention provides a method and mechanism for centralized management of user roles, but allows decentralized definitions of those user roles based upon the specific requirements of the local database systems.

Enterprise Users, Roles and Domains

Figure 3A:
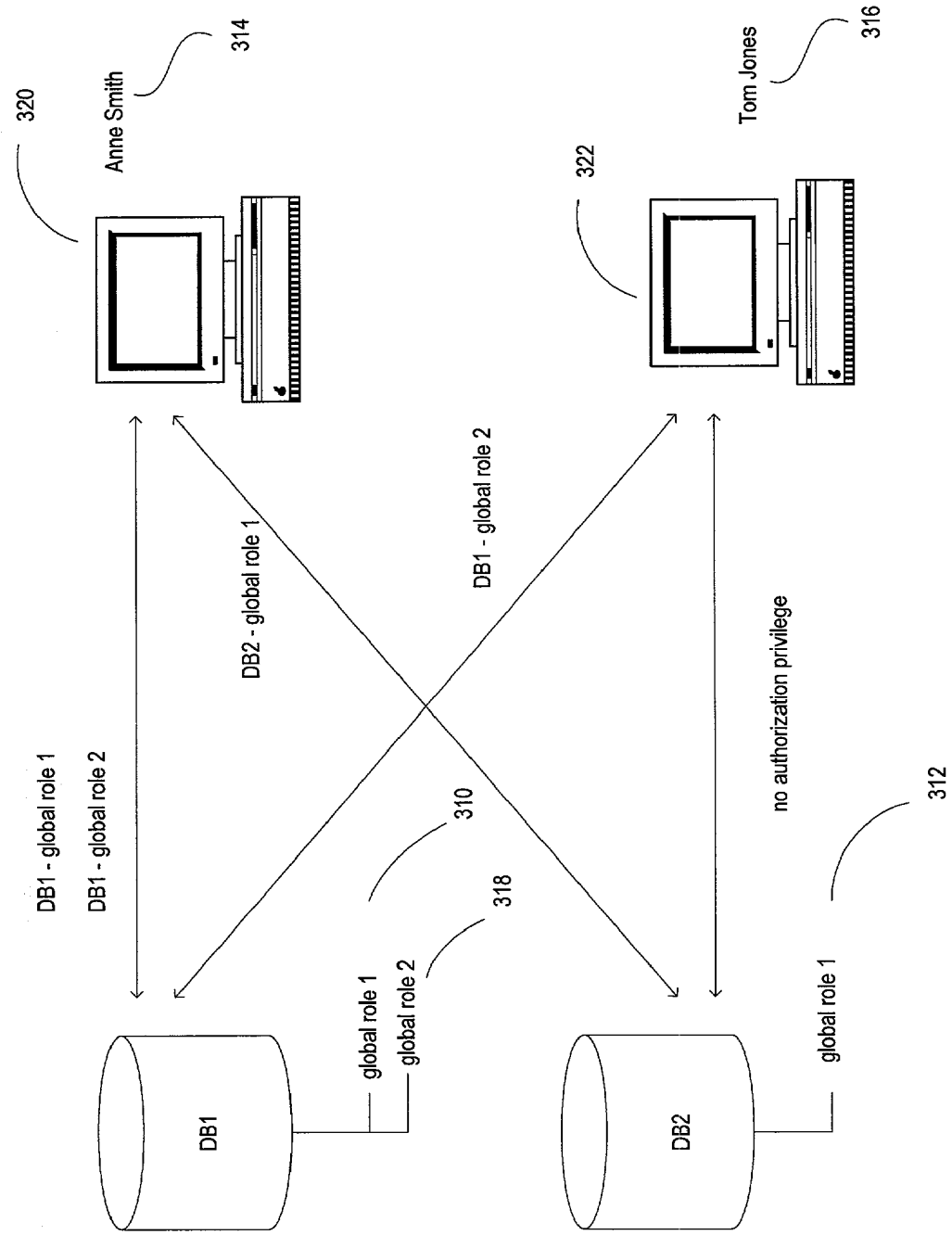
FIG. 3a depicts components of an example distributed system.

According to an embodiment, the present invention manages user access privileges to databases based upon a hierarchy of assigned "roles." To illustrate, FIG. 3a shows an example configuration of a first database DB1 and a second database DB2. Each database can be configured to maintain one or more sets of privileges known as "global roles." A global role is a set of privileges that is locally defined at each database, but which is centrally administered at the central LDAP directory. The first database DB1 has a local definition for two global roles 310 and 318. The second database DB2 has a local definition for a global role 312. A user 314 (Anne Smith") at a first access device 320 and a second user 316 ("Tom Jones) at a second access device 322 seek to access databases DB1 and DB2. Each user is an "enterprise user", which is a user defined and managed in a directory information system. According to an embodiment, each enterprise user has a unique identity across the enterprise.

Figure 3B:
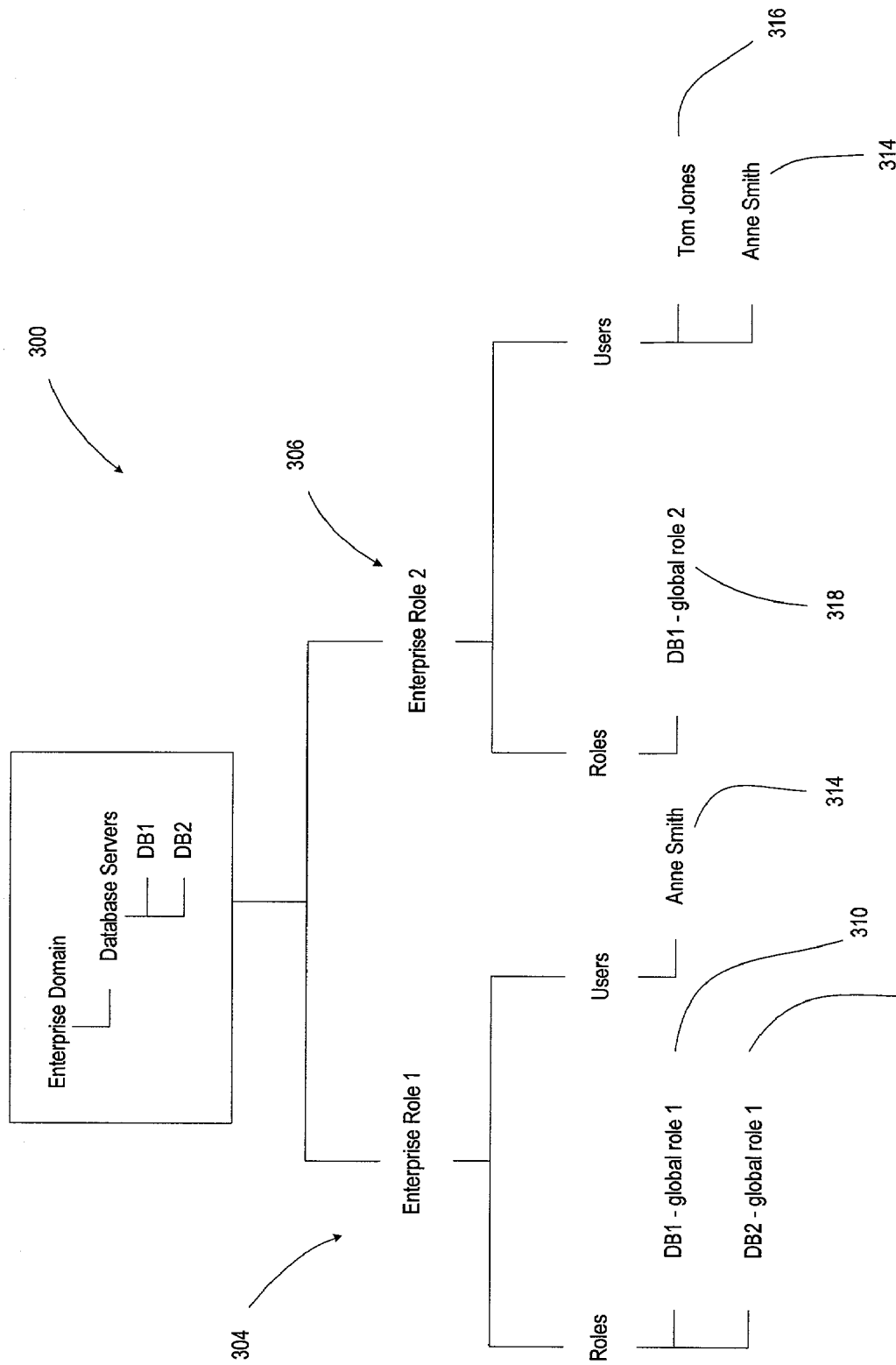
FIG. 3b represents a security hierarchy for the distributed system of FIG. 3a according to an embodiment of the invention.

FIG. 3b depicts an example of an enterprise domain 300 corresponding to the computing system of FIG. 3a according to an embodiment of the invention. An enterprise domain is a grouping of databases and roles that is used to manage user privileges. The enterprise domain 300 includes a list of the databases associated with that domain. Here, enterprise domain 300 identifies databases DB1 and DB2 as being grouped within it. It is at the enterprise domain level that roles are allocated to users to manage enterprise security according to an embodiment of the invention. Enterprise domains may be configured to match logical user or organizational boundaries. For example, the databases for each department of a large company may be grouped as separate enterprise domains.

The enterprise role hierarchy 300 includes a subtree for each "enterprise role" 304 and 306 defined in the enterprise domain. An enterprise role is a collection of global roles and associated users. As noted above, a global role is a set of defined privileges that is specific to a local database node. A user may be associated with an enterprise role, which assigns to that user the privileges defined by all the global roles contained within that enterprise role. Each enterprise role may be associated with multiple users. A user may be associated with multiple enterprise roles.

In the example enterprise domain 300 of FIG. 3b, a first enterprise role 304 includes two global roles 310 and 312. Global role 310 comprises a set of privileges at a first database DB1. Global role 312 comprises a set of privileges at a second database DB2. A first user 314 ("Anne Smith") is associated with enterprise role 304. Each user associated with enterprise role 304 has all of the privileges defined by global roles 310 and 312. Thus, when user Anne Smith 314 accesses database DB1, the privileges granted by global role 310 are given to user 314 based upon the user's association with first enterprise role 304. Similarly, when user Anne Smith 314 accesses database DB2, the privileges granted by global role 312 are given to that user based upon the user's association with first enterprise role 304.

The second enterprise role 306 includes a single global role 318 for a set of privileges granted at database DB1. Users 314 and 316, Anne Smith and Tom Jones respectively, are associated with enterprise role 306. Thus, when either user Anne Smith 314 or Tom Jones 316 accesses database DB1, the privileges granted by global role 318 are given to that user based upon the user's association with enterprise role 306.

Note that neither enterprise role 304 nor enterprise role 306 provides user Tom Jones 316 with any privileges at database DB2. Enterprise role 304 includes a global role 312 for database DB2, but user Tom Jones 316 has not been associated with this enterprise role 304. User Tom Jones 316 is associated with enterprise role 306, but this enterprise role does not include a global role for database DB2. Thus, even if user Tom Jones 316 is authenticated for access to database DB2, this user does not obtain any privileges or roles at that database unless such privileges and roles are locally defined outside of the enterprise roles.

According to an embodiment of the invention, a database obtains a user's global roles when the user logs in. If a user's global roles change, those changes do not take effect until the next time the user logs in. More details regarding the process for logging in is described below.

Centralized Directory Information System

According to an embodiment of the invention, the relationships between users and their associated roles in an enterprise domain structure are maintained as a hierarchy of objects in a directory information system. A directory in a directory information system can be considered an index to organized information. The directory lists objects, e.g., people and organizations, and gives details about each object. In a computerized environment, a directory is a database that stores collections of information about objects. The information in such a directory might represent any resource that require management—for example, employee names, titles, and security credentials, information about e-commerce partners, or about shared network resources such as conference rooms and printers.

A common directory information system is a directory based on the Lightweight Directory Access Protocol ("LDAP"). LDAP is a directory protocol that was developed at the University of Michigan, originally as a front end to access directory systems organized under the X.500 standard for open electronic directories (which was originally promulgated by the Comite Consultatif International de telephone et Telegraphe "CCITT" in 1988). Standalone LDAP server implementations are now commonly available to store and maintain directory information. Further details of the LDAP directory protocol can be located at the LDAP-devoted website maintained by the University of Michigan at http://www.umich.edu/~dirsvcs/ldap/, including the following documents (which are hereby incorporated by reference in their entirety): RFC-1777 Lightweight Directory Access Protocol; RFC-1558 A String Representation of LDAP Search Filters; RFC-1778 The String Representation of Standard Attribute Syntaxes; RFC-1779 A String Representation of Distinguished Names; RFC-1798 Connectionless LDAP RFC-1823 The LDAP Application Program Interface; and, RFC-1959 An LDAP URL Format.

The present invention is described with reference to LDAP directories. LDAP directory systems are normally organized in a hierarchical structure having entries (i.e., objects) organized in the form of a tree, which is referred to as a directory information tree ("DIT"). The DIT is often organized to reflect political, geographic, or organizational boundaries. In an LDAP directory, each collection of information about an object is called an entry. A unique name or ID (which is commonly called a "distinguished name") identifies each LDAP entry in the DIT. An LDAP entry is a collection of one or more entry attributes. Each entry attribute has a "type" and one or more "values." Each entry belongs to one or more object classes. Entries that are members of the same object class share a common composition of possible entry attribute types.

Databases (and other LDAP clients) refer to entries in the directory information system to determine enterprise user authorization at login. In an embodiment, the enterprise domain is associated with at least two types of objects: enterprise role objects and mapping objects. Enterprise role objects contain information about roles in the computing system. Mapping object contains mapping information between a full or partial distinguished name ("DN") in the directory information system and a user/schema name. Mapping objects are normally created for a particular domain. Mapping objects also reside under server objects, and are created for a particular database.

Figure 2A:
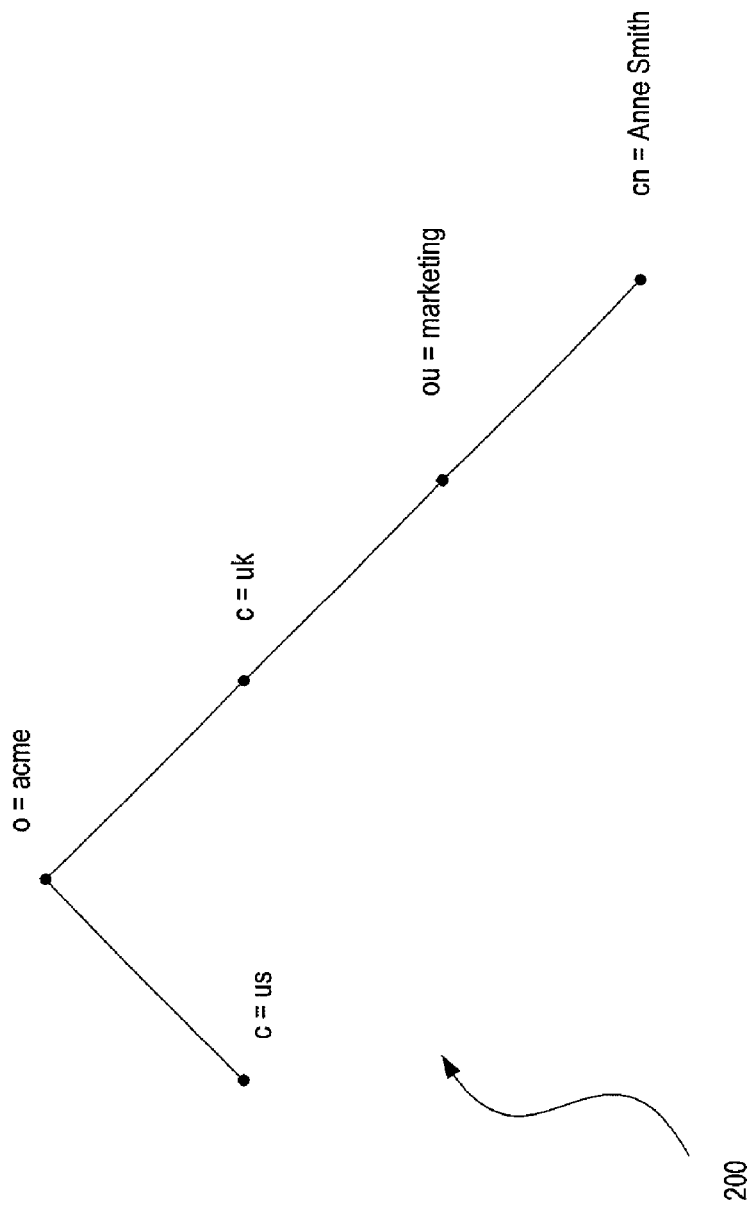
FIG. 2a represents an example directory information tree.

As noted above, each entry in an LDAP directory is uniquely identified by a distinguished name (DN). The distinguished name identifies where the entry resides in the directory's hierarchy. The directory hierarchy can often be represented in a tree structure, referred to as a directory information tree (DIT). An example of a DIT 200 is shown in FIG. 2a. The DIT 200 in FIG. 2a is structured along geographical and organizational lines. The example DIT 200 uses the following notation to define distinguished name components:

o=organization.
c=country
ou=organizational unit
cn=common name

In DIT 200, the branch on the right represents the entry for a person "Anne Smith," who works in the organizational unit (ou) "Marketing", in the country (c) of Great Britain (uk), in the organization (o) Acme. The DN for this Anne Smith entry is:

cn=Anne Smith,ou=Marketing,c=uk,o=acme.

Note that the conventional format of a distinguished name for a LDAP directory starts with the least significant component (that naming the entry itself) and proceeds to the most significant component (that just below the root).

In an embodiment of the invention, one or more administrative contexts are created in the directory to store enterprise information. The administrative context is created by an entity having suitable access permissions in the directory on a particular administrative context. For example, the person trying to create a new Context in "c=uk,o=acme" would need suitable permissions on that entry. The administrative context is created directly underneath, so that the root of the administrative context is "cn=AdminContext,c=uk,o=acme".

Any number of contexts may be suitably employed in the directory. Examples of contexts used in embodiments of the invention are user-defined contexts and root context. The root context sits at the root of the directory tree. In the preferred embodiment, there exists one root context, but there may be any number of user-defined contexts in a directory. A user-defined Context is created by an entity with access permissions in the directory on a particular administrative context. In an embodiment, the context includes the attribute names that will hold a nickname attribute and the user search base. The default for the Nickname Attribute in one approach is CN and the default for User Search Base is the root of the DIT or the parent of the administrative context.

An enterprise domain object, which may also be referred to as a RDBMS (relational database management system) Enterprise Domain object, is an object class that is employed in the invention. In an embodiment, objects in this class maintain the enterprise domain name (RDN) and the list of RDBMS servers participating in the enterprise domain. Note that other types of database management systems may also be employed with the present invention (e.g., object-based databases), and thus the invention is not limited to relational databases. Enterprise domain objects may also track the global users participating in the respective domains. The list of users can have either user names or group names. The list of users defines the global users set. This object class may also include a list of accepted authentication types for databases in the domain, such as password, SSL, and/or ALL.

A server object, which can also be referred to as a RDBMS Server Object, is another object class that is employed in embodiments of the invention to identify database servers in the enterprise domain. Objects in this class may include attributes that identify the server name (RDN), server global name, server certificate, directory password, and a list of trusted users permitted for direct links between servers without authentication. According to an embodiment, the server object exists directly under the cn=AdminContext object, but it may also be located elsewhere. The server object may include other attributes, such as additional attributes for storing information regarding network aliases, server certificates, and listener information.

The enterprise role object is another object usable in the invention, which corresponds to the set of global roles that are assigned to an enterprise role. Enterprise roles may also contain other enterprise roles. This object may also contain the list of users to whom these roles are assigned. According to an embodiment, the enterprise role entries exist under the enterprise domain entry. Enterprise roles contain server global roles and may contain enterprise roles in a recursive manner. The enterprise roles can be assigned to users. The role assignees can be user groups also. The user group is useful for mapping defined group concepts for role assignment. The user's X.500 distinguished name, which is used for authentication using SSL, is an item of information used for role assignment in the enterprise role object. In an alternate embodiment, SSL is not employed and this information is not based in the DN.

An enterprise role comprises server global roles in an embodiment, and may contain enterprise roles in a recursive manner. This object class may include another object class for grouping users, so that users allocated this role will be represented as members of the group. The role assignees can be user groups also. The user group is useful for mapping OS defined group concept for role assignment, for example, the NT user groups. The user entry is preferably not modified for assigning roles. The user's X.500 distinguished name, which is used for authentication using SSL, is an item of information used for role assignment in the enterprise role object in one embodiment. In an embodiment, the enterprise role will contain the following information: (a) Zero or more global roles; (b) Zero or more enterprise roles; and (c) List of users to whom the enterprise role has been assigned.

The User Object is another object class that may be employed in embodiments of the invention. In an embodiment, users who intend to make use of the security framework of the invention are associated with a globally unique name, e.g., X.500 Distinguished Name. In one embodiment, this name is used when roles are assigned to these users. As noted above, the user entry is preferably not modified for assigning roles. Other user information, e.g., unique user information such as a global user ID, may also be employed when assigning roles.

Mapping objects comprise another object class useable in the invention. As described in more detail below, these objects are used for schema assignments, to map enterprise users to local database schemas. The mapping object contains the mapping of an enterprise DN and a native database username. According to an embodiment, the mapping object exists as a child of a server object or of an enterprise domain object. In an embodiment, the mapping object is a group object, where the CN attribute reflects the schema name and the members attribute contains all users who map to that schema. In an alternate embodiment, the mapping object is not a group object, where a native user attribute reflects the schema name and a distinguished name attribute contains the user identification that maps to a schema. An entry level mapping object according to an embodiment is an objectclass that contains a single mapping represented as two attributes: a full DN for an Enterprise User and a native username. A subtree-level mapping object is an objectclass that contains a single mapping represented as two attributes, e.g., a DN that does not necessarily represent an Enterprise User, and a native username. Only users under that DN in the directory tree will be mapped to the specified native user. If the DN itself is a user, then that user is not mapped to the native user. A full DN preferably takes precedence over a partial DN, and a mapping under the server takes precedence over one under that server's enterprise domain.

Other and additional object classes or combinations of object classes may be employed within the scope of the invention. For example, an application context is another object that can be used in the invention that contains a value for an application context attribute. This object may include information such user title, job description, task within this application, etc. The application context entry can exist in the subtree of an enterprise domain. Under the application context container object could be another container object representing an application context namespace, and under that another container representing an application context attribute name. At the bottom of these entries could be entries representing application context values. Each of these value entries will include the list of users who have been allocated this value. One reason to use an application context container is to avoid namespace overlap between context names and enterprise role names. Another example object class is for administration groups, which as explained in more detail below, support access control on entries in the directory. An exemplary approach for managing attribute information is disclosed in co-pending U.S. application Ser. No. 09/974,085, filed on Oct. 9, 2001, which is hereby incorporated by reference in its entirety.

Figure 2B:
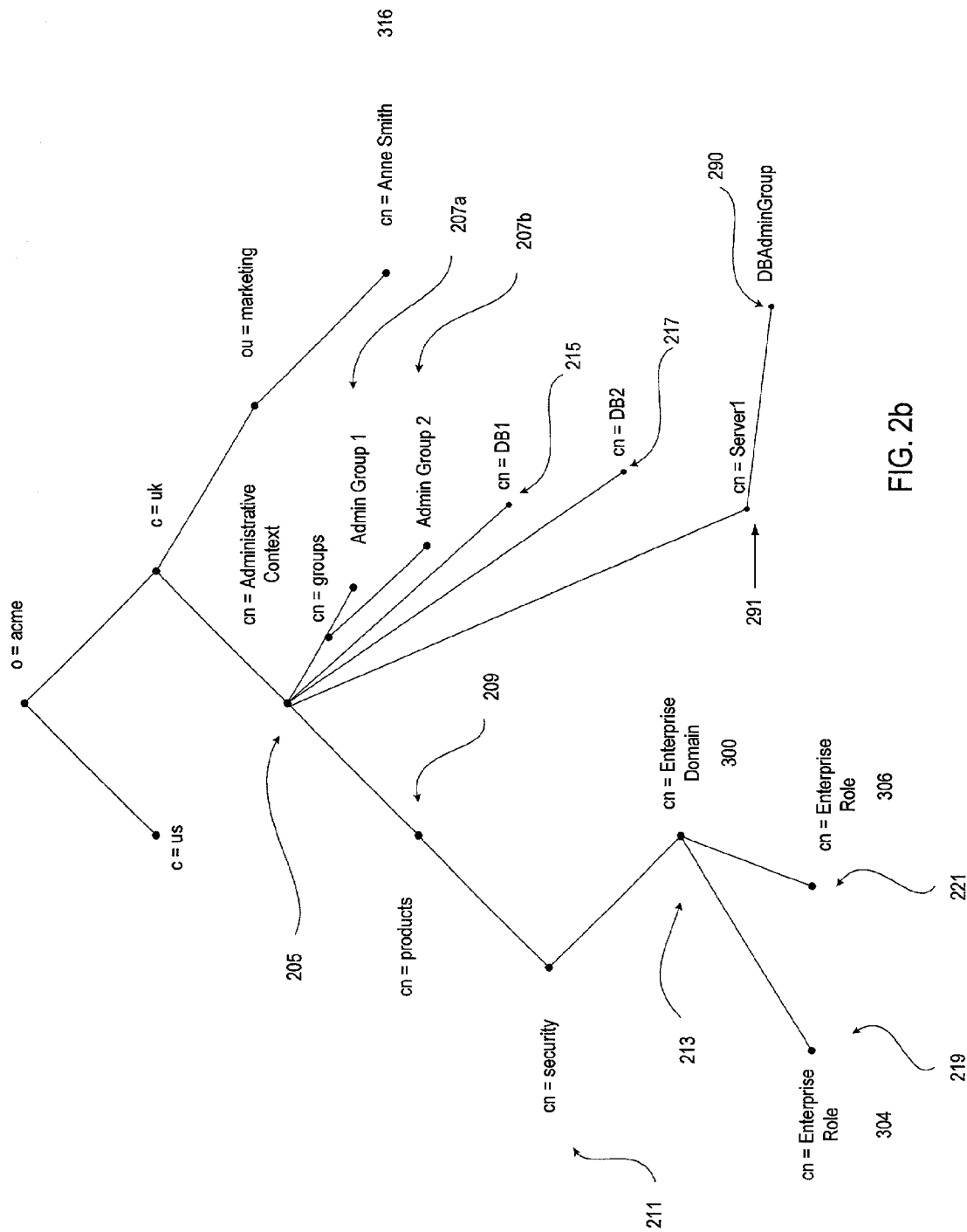
FIG. 2b represents a directory information tree having security management objects according to an embodiment of the invention.

In the present invention, one or more naming contexts are chosen to contain enterprise information. To illustrate, shown in FIG. 2b are additional administrative entries added to the LDAP DIT 200 of FIG. 2a. An administrative context 205 (cn=Administrative Context) is a created as a special entry in the LDAP directory to contain entries to support directory naming and enterprise user security. Various container objects may exist in the administrative context subtree. For example, a products container object 209 and a security container object 211 may exist in the subtree beneath the administrative context 205.

According to an embodiment, enterprise domain information is represented in the LDAP directory by adding one or more enterprise domain objects 213 in the subtree beneath the security container object 211. For the purposes of illustration, the enterprise domain object 213 in FIG. 2b is shown representing the enterprise domain 300 of FIG. 3b. Therefore, the subtree beneath enterprise domain object 213 includes objects that match the enterprise domain hierarchy shown in FIG. 3b. The enterprise domain object 213 includes an attribute that identifies the databases associated with the domain.

Any enterprise roles associated with enterprise domain 300 would be represented as enterprise role objects in the subtree beneath enterprise domain object 213. Thus, enterprise role object 219 in the subtree beneath enterprise domain object 213 represents enterprise role 304 of FIG. 3b. A first attribute or set of attributes in enterprise role object 219 identifies the global roles associated with enterprise role 304. A second attribute or set of attributes in enterprise role object 219 contains a mapping between enterprise users and enterprise role 304. Similarly, enterprise role object 221 in the subtree beneath enterprise domain object 213 represents enterprise role 306 of FIG. 3b. A first attribute or set of attributes in enterprise role object 221 identifies the global roles associated with enterprise role 306. A second attribute or set of attributes in enterprise role object 221 contains a mapping between enterprise users and enterprise role 306.

Any enterprise domain structure can be mapped into an LDAP directory tree by adding one or more entries corresponding to the enterprise entity being mapped. While the above description of the embodiment shown in FIG. 2b describes example locations for the placement of objects within the administrative context 205, it is noted that other embodiments of the invention may locate any or all of the objects in alternate locations within the LDAP directory.

The subtree under the administrative context 205 can also include other objects representing other entities in a computer system, such as server and network entities. For example, the administrative context may include a database server object. In the example of FIG. 2b, objects 215 and 217 in the subtree beneath administrative context entry 205 identify the databases DB1 and DB2. A database server object contains information about a database server. It can be created during the database installation and can be added later by members of the privileged administrative groups. A database server object is the parent of database level mapping objects that contain mapping information between full or partial DNs and shared schema names, as described in more detail below.

Access to enterprise domain, enterprise role and the RDBMS server object entries should be properly managed for security access reasons. Thus, permission to create, delete or modify enterprise domain and the enterprise role object entries should be granted only to authorized enterprise domain administrators.

Access control lists ("ACLs") are employed in one embodiment to control access to enterprise objects. When administrative operations are attempted within a directory, the directory server checks the enterprise ACLs to ensure that the user has the required permissions to perform those operations. Otherwise, the operation is disallowed. Thus, ACLs in the directory protect directory data from unauthorized operations by directory users. According to an embodiment, ACLs may be assigned to an entire group of administrators. For an LDAP directory, this is accomplished by defining group objects whose membership will be a list of user DNs. The Enterprise Domain and the subtree under it (for enterprise roles) will use the same ACLs for the enterprise domain entry and the subtree. The server object may also be administered by a group of administrators although the membership of this group may be different from the membership of enterprise domain administrators. Some of the security-related directory objects that may be protected using ACLs are: (a) Databases; (b) Enterprise domains; (c) Default Domain; (d) Enterprise roles; (e) Administrative groups; (f) Database Level Mappings; and (g) Domain Level Mappings. For each object, the ACL limits who can create, modify, or read them.

Current User Links

Users at a first database may perform operations that require access to a second database. For example, the user at the first database may execute a database query operation that selects data from a table or object in the second database. As another example, the user at the first database may create a procedure or function with an embedded linking operation that performs one or more operations at the second database.

To illustrate, consider if a user Scott creates a procedure scott.p on a first database DB1 to maintain and update some tables, but would like to grant another user Jane permission to perform the actual work on his behalf. This can be accomplished by granting user Jane execute privileges for the procedure scott.p in which execution of the procedure by Jane creates a temporary security context switch to Scott's security context, such that Jane has access to Scott's objects. In effect, this approach causes the system to consider the "current" user to be Scott, although Jane (the "connected" user) is actually executing the procedure. This dynamic security context switch can be configured to occur whenever a first user executes another user's procedure or view, which effectively allows users to create procedures and grant privileges in such a way as to allow others controlled access to the first users' objects.

Now consider if the procedure scott.p includes a link to a second database DB2. It is often desirable to provide the user that executes a procedure with a security context consistent with the owner of the procedure, particularly when the procedure includes a network link to a second database. In the present example, when user Jane executes procedure scott.p, then the network link to the second database DB2 should be consistent with the security context of the rest of the procedure; that is, user Jane should connect to DB2 with user Scott's security context, and thus temporarily have the necessary privileges to access the appropriate objects on database DB2.

One approach to providing a user access to a second database from a first database is with "connected-user" links, which are also referred to as "anonymous" links. A connected-user link uses the credentials of the connected user to obtain access to a remote database. In the present example, if user Jane executes the procedure scott.p on a first database DB1, which uses a connected-user link to the second database DB2, then user Jane will be connected to the second database using the security context for user Jane (the connected user) rather than the security context for user Scott (the owner of the procedure). Thus, it is possible that the user executing a procedure owned by another would not obtain the necessary access privileges on the remote database to successfully execute the procedure.

An alternate linking approach is to use "fixed user" or "named" links. Unlike a connected-user link, a named link contains both the connect string and the appropriate user credentials (e.g., username/password or other authentication information) for the relevant account on the remote server. Thus, named links allow a user on a first database to execute a procedure at a second database using the security context of another user. The drawback to this approach is that providing this authentication information in a named link creates a potential security problem, since the authentication information may become available to unauthorized users or administrators that have access to the named link on either the source or target databases. Encrypting the password information is not an optimal solution since management and transmission of encryption keys between databases provides another potential source of security failure.

The present invention provides a method and mechanism (referred to herein as "current user links") for providing connection links as a current user from a first database to a second database without requiring explicit transmission of authentication credentials in the network link between the databases. According to an embodiment, the link to the remote database is embedded into the stored object that is executed. By embedding the database link in a stored object (such as a procedure, view, or trigger), the owner of the stored object can ensure that connection is made using the owner's security context. When any user runs a stored object, the privilege domain of the object owner is used. In an embodiment, this occurs by passing the DN of the current user from the first database to the second database. The transmitted DN is used to map the connected user to the appropriate schema at the second database and for authorizing privileges. Mapping objects may be used to perform this mapping at remote databases.

When executing a stored object (such as a procedure, view, or trigger) in an embodiment of the invention, the current user is the user that created the stored object, and not the user that called it. For example, if the database link appears inside procedure scott.p, created by user Scott, and user Jane calls procedure scott.p, then the current user will be Scott—not user Jane. However, if user Jane uses the database link directly, and not from within procedure scott.p, then the current user will be Jane. Thus, in the case of a database link being used directly, the current user will be the same as the connected user.

Figure 4:
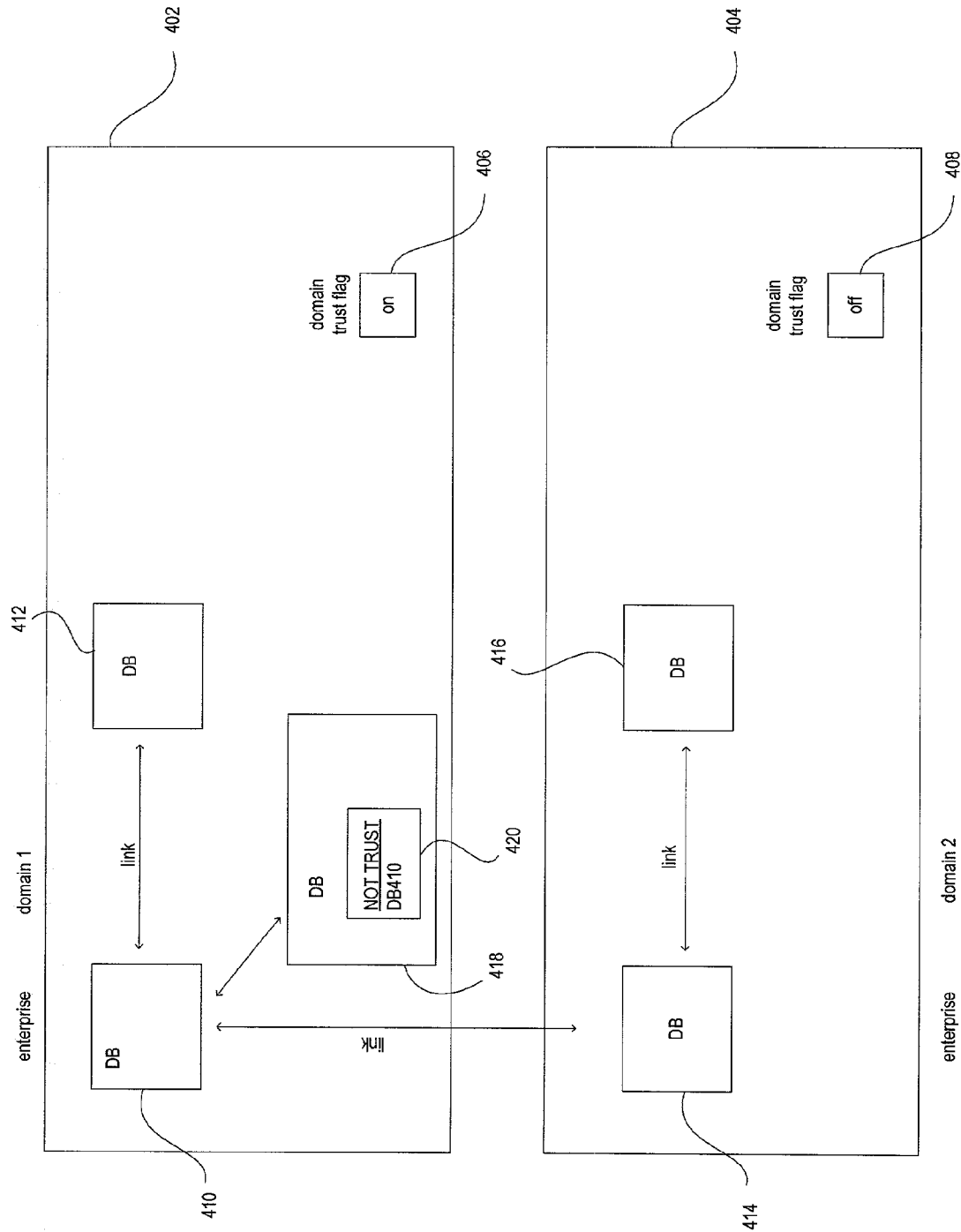
FIG. 4 is a diagram showing components used for current user links according to an embodiment of the invention.

To eliminate the need to pass authentication credentials from one database to another, trusted relationships can be implemented between database servers. FIG. 4 illustrates an embodiment of this aspect of the invention. Shown in FIG. 4 is a first enterprise domain 402 and a second enterprise domain 404. Each enterprise domain is associated with a domain "trust flag". A domain trust flag is a flag that indicates whether other databases within the same enterprise domain should be trusted. According to an embodiment, the domain trust flag is a field in a domain object entry in the LDAP directory. If the domain trust flag is set "on", then a user executing an application on a first database is permitted to link to another database within the same enterprise domain without providing additional authentication credentials ("current user link"). Instead, the second database will trust that the first database had already properly authenticated the user, and that this authentication should be accepted at the second database. Thus, the second database will not independently authenticate the user before allowing access. If the domain trust flag is set "off", then the second database will not accept the link until proper authentication credentials have been verified.

Enterprise domain 402 is associated with a domain trust flag 406 that is turned "on". Since the domain trust flag 406 is turned on, users on a first database 410 in enterprise domain 402 that seek to access a second database 412 within the same enterprise domain will be permitted to do so without providing authentication credentials to the second database 412. The database must be able to trust that the communications are really coming from a trusted database within the same enterprise domain. According to an embodiment, SSL is used to authenticate that a communications link is established from a trusted database within the same enterprise domain. Even if data is sent in only one direction between two trusted database servers, mutual authentication is preferably performed using SSL between the two databases.

Enterprise domain 404 includes a domain trust flag 408 that is turned "off". Since the domain trust flag is turned off, current user links according to an embodiment of the invention cannot be formed between databases in this enterprise domain 404. Thus, users on a database 414 in enterprise domain 404 cannot use current user links to connect to database 416 within the same enterprise domain unless authentication credentials are supplied to database 416 sufficient to allow the desired access.

According to the present embodiment, current user links (also referred to as trusted links) can be formed only for database servers within the same enterprise domain. Thus, a database 410 in enterprise domain 402 cannot form a current user link to database 414 in enterprise domain 404 unless proper authentication credentials are verified by both databases, even if the domain trust flag in turned on in both domains. According to an alternate embodiment, additional trust flags of varying scope may be employed to permit current user links between database servers in different enterprise domains.

Lists could be established to identify which servers are to be trusted by other servers within the domain. This can be explicitly implemented using a central "trusted servers list" that lists all servers that should be trusted by other servers in the domain when establishing a current user link. Alternatively, this can be implicitly implemented by considering all recognized servers in the domain to be centrally "trusted" if the domain trust flag is turned "on."

Each database server may also maintain a local trusted servers list that explicitly lists which database servers it will or will not trust, which allows each server to locally decide whether to "opt out" of the trusted server arrangement with respect to one or more of the other database within the domain. In the system shown in FIG. 4, database server 418 in enterprise domain 402 includes a local trusted servers list 420 that lists database server 410 as an untrusted server. Thus, a link cannot be established from database server 410 to database server 418 unless the user's authentication credentials are supplied and verified, even if the domain trust flag 406 is turned on. However, a current user link can be established to database server 418 from other database servers in the same enterprise domain that are not listed as untrusted in trusted servers list 420 (e.g., server 412).

The present invention therefore provides a mechanism that allows databases the flexibility to distrust some, but not necessarily all, members of their distributed enterprise domain. This partial trust of the domain may produce a transitivity problem under certain circumstances. For example, assume that databases A, B, and C are all members of the same domain. A and B trust each other, and B and C trust each other, but C doesn't trust A. Even though C doesn't trust A, a user on A can still execute a procedure on A that via a database link connects to and executes a procedure on B, that in turn connects to C. Database C may not realize that the initiator of these links was on A, an untrusted database.

According to an embodiment, the solution is to propagate information with current user links that indicate all prior <database, user> pairs in the current chain of links, which is used in conjunction with local lists of trusted database servers. In a chain of current user links, each database will need to ensure that there is no member of the link chain that is untrusted. Thus, prior to establishing a current user link, the remote database will examine the entire list of prior databases in the chain to ensure that no databases in the chain are listed as "untrusted" in the local trusted servers list.

In one approach, each database in the chain appends to the chain information with the identity of itself and the current user prior to establishing a current user link to the next database. In an alternate approach, the second database in current user link appends the chain information with the <database,user> information for the initiator of the link. Under either approach, each database along the way adds to the chain information.

Figure 5:
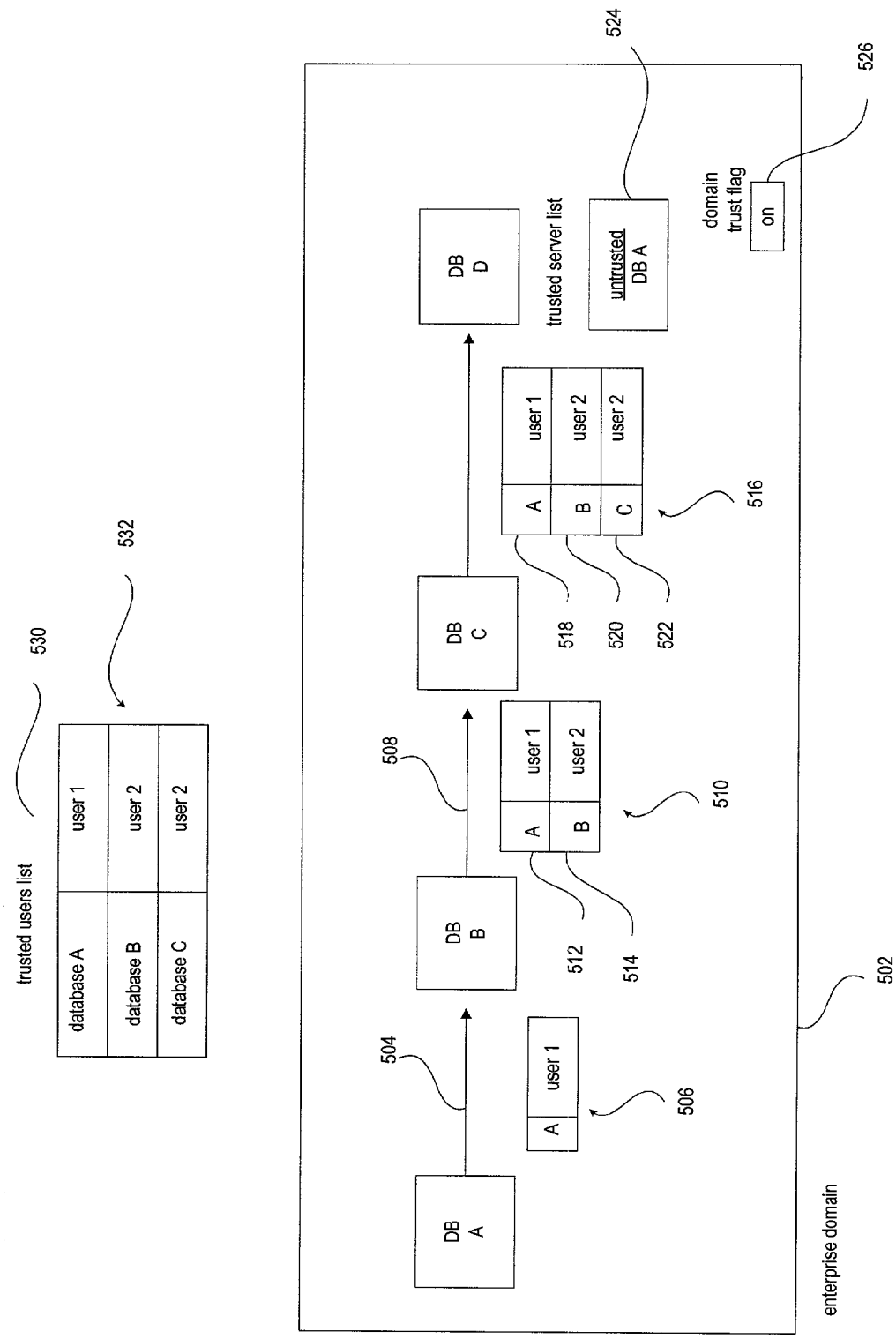
FIG. 5 shows a chain of current user links according to an embodiment of the invention.

FIG. 5 illustrates this aspect of the invention for an enterprise domain 502. Assume that a first user ("user 1") on database A seeks to access database B. The domain trust flag 526 is set "on", allowing current user links to be established between databases in enterprise domain 502. When establishing a current user link from database A to database B, information 506 is provided indicating all prior <database, user> pairs previously encountered in the current user link chain. Since this is the first current user link in the chain, only the identity of database A and its associated user are provided in information element 506. Assume that user 1 on database B executes a procedure, owned by a second user ("user 2"), that seeks to perform an operation on database C. When establishing a current user link from database B to database C, information 510 is provided indicating all prior <database,user> pairs previously encountered in the current user link chain. Here, both the <database A, user 1> pair 512 and the <database B, user 2> pair 514 are identified in information element 510. Further assume that the executed procedure on database C requires an operation to be performed on database D. When establishing a current user link from database C to database D, information 516 is provided indicating all prior <database,user> pairs previously encountered in the current user link chain. Here, the <database A, user 1> pair 512, the <database B, user 2> pair 514, and the <database C, user 2> pair 522 are identified in information element 516.

By supplying the entire history of <database, user> pairs in the chain of current user links, any database server in the chain can examine that information to determine whether any untrusted servers appear on that list and take actions appropriate for that situation. For example, note that database D in FIG. 5 includes a local trusted servers list 524 that lists database A as an untrusted server. Before database D permits a current user link from database C, it will examine the information element 516 for the chain of current user links to determine if any untrusted servers appear in that list. Since database A appears in the information list 516 (as <database, user> pair 518), database D will reject the current user link from database C, even though database C does not itself appear in database D's local trusted servers list 524 as an untrusted server.

In addition to untrusted servers, current user links may be rejected based upon untrusted users that appear in the chain of current user links. That a particular <database_n,user_n> pair is trusted means that database_n is trusted to connect to another database via current user link, without the user's credentials, as user_n. One or more lists may be established to indicate that databases in the domain are to trust or not trust certain users when establishing current user links, thereby forming a trusted users list 530. Note that the trusted users list 530 may be implemented by adding user information to the trusted servers list(s) (such that the trusted users list is the same list as the trusted servers list, central or local, but with information regarding trusted/untrusted users), or may be implemented as an entirely different list depending upon the particular use to which the invention is directed. In an embodiment, the trusted users list is configured to indicate that servers in the domain are trusted to connect only as particular global users and the member databases can be configured to trust no more than what is indicated by the trusted users list. The trusted users list 530 may include a central membership list 532 that is the set of <database, user> pairs that can be trusted by other database members in an enterprise domain. Separate trusted users lists can also be maintained locally at the database servers (either as part of or separate from the local trusted servers list), or a combination of local lists and a centrally maintained list can be used to screen attempts to establish current user links.

If it is desired to only check server identities in the prior chain of links without regard to prior users in the chain, then the trusted servers list(s) are used without listing trusted/untrusted users. If it is desired to check user identities before allowing a current user link, then the trusted users list (whether separate or part of the trusted servers list) is employed to list trusted or untrusted users.

An additional mechanism that a group of databases can use to increase security and to eliminate threats introduced by transitivity is to enforce isolationism. For example, if databases A, B, C, and D wish to ensure that they will not accept any link strings that have passed through other untrusted databases, all these databases can all agree to only accept current user links from each other. Databases A, B, C, and D will, in effect, become isolated from the rest of the enterprise domain, thereby eliminating potential transitivity problems. In a sense, these databases will have formed their own subdomain. Similarly, if all databases in the enterprise domain agree that a particular database X is not to be trusted, then all the databases can designate this in their local trusted servers list. Regardless of what is listed for Database X at the trusted users list, Database X will effectively be isolated from the rest of the domain.

The following are examples of maintenance operations for the trusted servers list:

Allow All: This operation configures the trusted servers list to indicate that the local database should abide by the information about trusted <database, user> pairs listed at the trusted users list at the time the current user link is executed. In an embodiment, this operation is implemented by deleting all entries in the trusted server table, and then adding an "ALLOW ALL" identifier.

Deny All: This operation configures the trusted servers list to indicate that no other databases are to be trusted to connect via current user links, regardless of what is listed at the trusted users list. In an embodiment, this operation is implemented by deleting all entries in the trusted servers list table, and then adding a "DENY ALL" identifier.

Allow DB: This operation configures the trusted servers list to allow a specific database to connect via current user link as any user listed with that database in a <database, user> pair at the trusted users list. In an embodiment, this operation is implemented according to the following: If there is an "ALLOW ALL" in the table, and no "DENY <db>" for a particular database "db", then fail with error message "Database <db> already allowed by ALLOW ALL"; If there is an "ALLOW ALL" in the table, and a "DENY <db>", then delete the "DENY <db>"; If there is a "DENY ALL" in the table, and no "ALLOW <db>", then add "ALLOW <db>"; If there is a "DENY ALL" in the table, and an "ALLOW <db>", then fail with error "Database <db> already allowed by an existing "ALLOW <db>".

Deny DB: This operation configures the trusted servers list to prohibit a specific database from connecting via a current user link as any user. According to an embodiment, this operation is implemented according to the following: If there is a "DENY ALL" in the table, and no "ALLOW <db>" for a particular database "db", then fail with error message "Database <db> already denied by DENY ALL"; If there is a "DENY ALL" in the table, and an "ALLOW <db>", then delete the "ALLOW <db>"; If there is an "ALLOW ALL" in the table, and no "DENY <db>", then add "DENY <db>"; If there is an "ALLOW ALL" in the table, and a "DENY <db>", then fail with error "Database <db> already denied by an existing "DENY <db>".

Check list (db_name): This operation determines whether a database <db> is trusted. In an embodiment, this operation is implemented as follows: If there is an "ALLOW ALL" in the table, and no "DENY <db>", then return TRUE; If there is a "DENY ALL" in the table, and an "ALLOW <db>", then return TRUE; If there is an "ALLOW ALL" in the table, and a "DENY <db>", then return FALSE; If there is a "DENY ALL" in the table, and no "ALLOW <db>", then return FALSE.

According to an embodiment, the default trusted servers list includes one entry at database creation to designate all other databases in the domain as trusted ("Allow All"). This default state results in the database trusting exactly those <database, user> pairs listed at the trusted users list, if the trusted users list is being used. If any database performs an Allow All operation, the database reverts to this trust situation. The local database may wish to obtain a list of the current members of the domain, and/or which users they are trusted to connect as.

Each database may modify the trusted servers list to indicate that certain databases are to be trusted or not trusted, or that all or none are to be trusted. If a database sets its local trusted servers list to trust no other databases ("Deny All"), no other databases will be permitted to connect via current user links, regardless of the settings in the trusted users list. If the local database performs a local Deny All operation, and then subsequently wishes to trust a specific database DBx, then the database DBx will be added as a trusted database to the local trusted servers list ("Allow DBx" operation). A later "Deny DBx" operation will simply reverse the effects of a specific "Allow DBx", and a later "Deny All" operation will reverse all previous "Allow DBxs" operations, e.g., by making the appropriate entries in the trusted servers list. Similarly, if the local database performed an "Allow All" operation, and subsequently wishes to deny current user links from a specific database, the trusted servers list can be modified to do so.

The effect of the trusted servers list is to potentially reduce the list of allowed connections from that permitted by the trusted users list. In the present embodiment, if the trusted servers list includes entries that are not listed at the trusted users list, those entries have no effect. However, a local database may wish to include entries for databases that are considered especially threatening, even if not listed at the trusted users list, to avoid a temporary security risk in the situation where the database suddenly becomes centrally trusted by the trusted users list. This could be done by performing an "Allow All" operation, and then listing that particular database as untrusted. If the local database wishes to be extra careful and prevent access by any database that might be added without its knowledge to the trusted users list, could have to be accomplished by performing a "Deny All" operation, and then Allowing the exact list of databases specifically intended to be trusted.

According to an embodiment, current user links are implemented based upon the current user being a global enterprise user with accounts on both databases involved. The accounts can be either unique or shared accounts. Since the remote database allows a connection for the claimed global user without proof of identity, it must trust that the request is valid—that is, the calling user has been properly authenticated by the first database, the calling user has legitimate access to the link, and that the link itself is legitimate. In an embodiment, the database should therefore verify that the originator of the link is in fact a database server, and not a client. In addition, the originating database should trust the remote database before connecting as the specified user, since commands may be executed back on the originating database by the remote database, via the link. This means that the two databases should mutually authenticate whenever a current user link is opened. In this approach, if mutual authentication fails then the link fails. Alternatively, one-way authentication between database servers may be employed if desired.

In addition to verifying that the other database is a server in the domain, the database receiving the connection request via a current user link ensures that the database originating the current user link is trusted to connect as the particular global user involved. This determination of trust occurs in two steps: first the database ensures that the originating database is listed at the trusted users list as being trusted to connect as that user, and second that the originating database is not listed locally in the trusted servers list as not to be trusted. If the <database,user> pair is determined to be trusted, that implies that the originating database is trusted to locally administer that global user properly.

Figure 6:
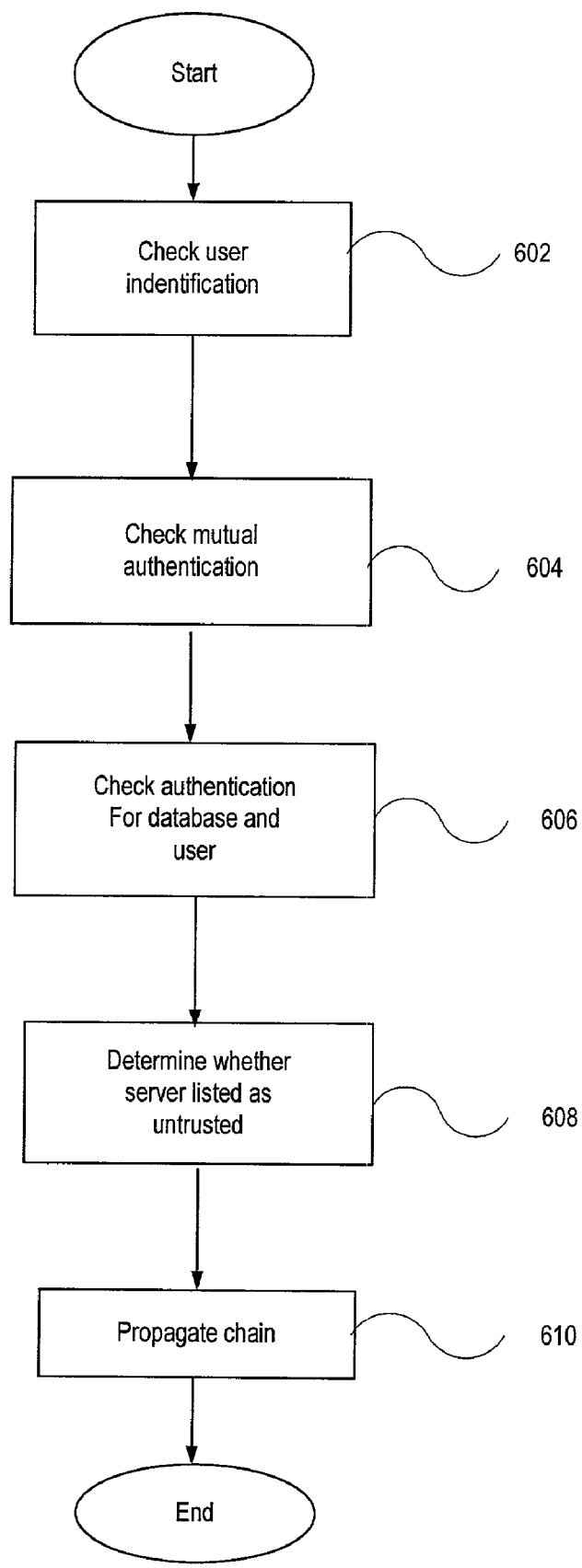
FIG. 6 is a flowchart of a process for implementing current user links according to an embodiment of the invention.

FIG. 6 shows a flowchart of a process to create a current user link according to an embodiment of the invention. At 602, the process determines whether the current user is a properly created and authenticated global user on the database. At 604, the process checks for whether mutual authentication with the remote database is successful, indicating the remote database is the expected one. The process thereafter checks that the list of authorizations for the remote database includes the current user (606). At 608, the process checks that the remote database is not designated as untrusted in the local trusted servers list. The process then propagates the chain stored in the session info, preferably without other changes to the remote database while the connection is being attempted (610).

Figure 7:
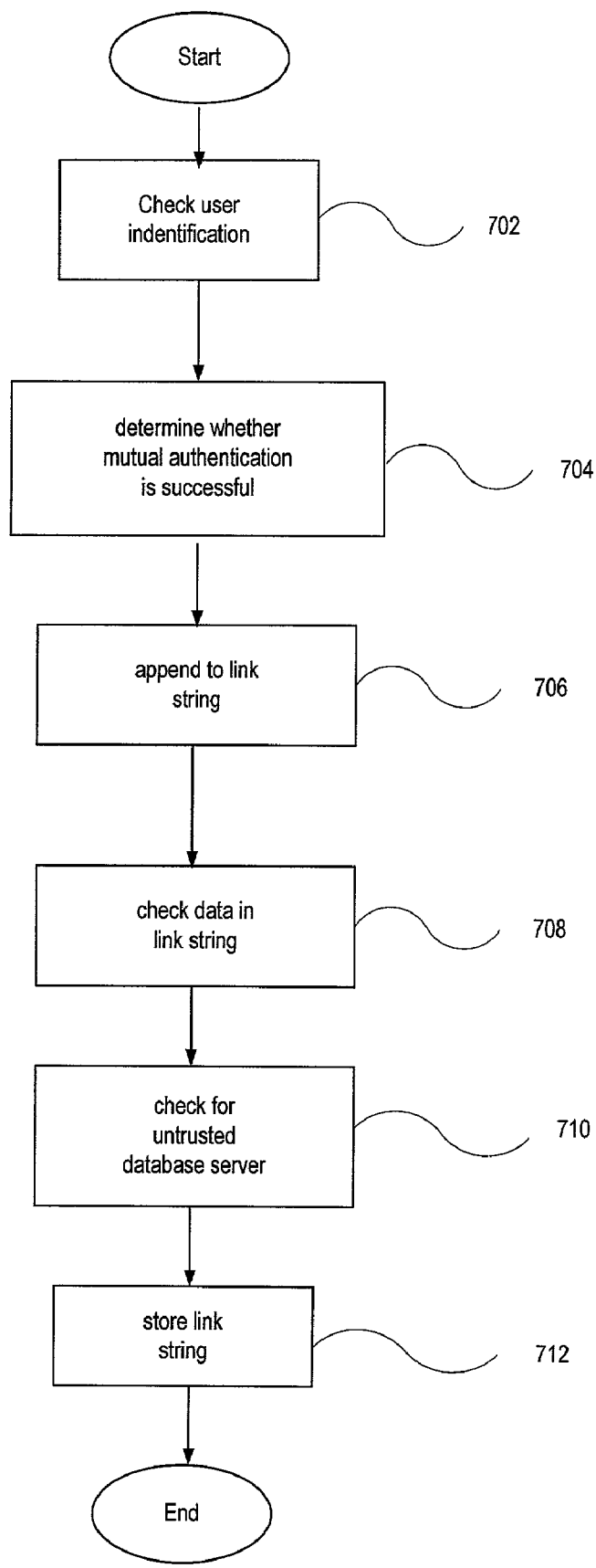
FIG. 7 shows a process for passing information relating to a chain of current user links according to an embodiment of the invention.

FIG. 7 shows a flowchart of a process for accepting a connection from a current user link. At 702, the process checks that the user is a properly created and authenticated global user on the database with appropriate privileges. At 704, the process determines whether mutual authentication with the originating database is successful, indicating that the remote database is the same as that indicated by the last member of the chain. The process then adds the relevant pair <database, user> to the link chain information string (which may be empty), and stores the updated chain in the session data (706). The last <database, user> pair in the link chain is checked to determine whether it is listed as being authorized (e.g., as provided in the mutual authentication step) (708). At 710, the process checks that no database in the chain is designated as untrusted in the local trusted servers list. The process then stores the link chain such that it can be updated if necessary for subsequent current user links originating from this connection (712).

According to an embodiment, only the last <database, user> entry in the link chain is locally checked for trust-authorization by the trusted users list. This is because all previous entries were presumably checked by previous databases in the string of links. Since no database can trust more than the trusted users list indicates in the present embodiment, it can be assumed that all entries in the chain, except possibly the last, are listed as trusted at the trusted users list. All that remains is to check the last entry.

The present invention can also provides sufficient audit information to trace current user links back to the originating connected user. Maintaining a link chain of <database,user> entries facilitates auditing of user activities, since the link information allows actions performed at one database to be traced. In effect, the links are traceable backwards first to the connected user on the destination database (which is the current user on the originating database, and then through the chain of current user links to the connected user on the originating database.

In the above description, the trusted servers list only included a listing of trusted and untrusted database servers.

In an alternate embodiment, the local trusted servers list also includes a list of trusted and untrusted <database, user> pairs. In this alternate embodiment, the additional <database, user> pair information allows finer granularity control over the exact current user links that may be established to the database.

System Architecture Overview

Figure 8:
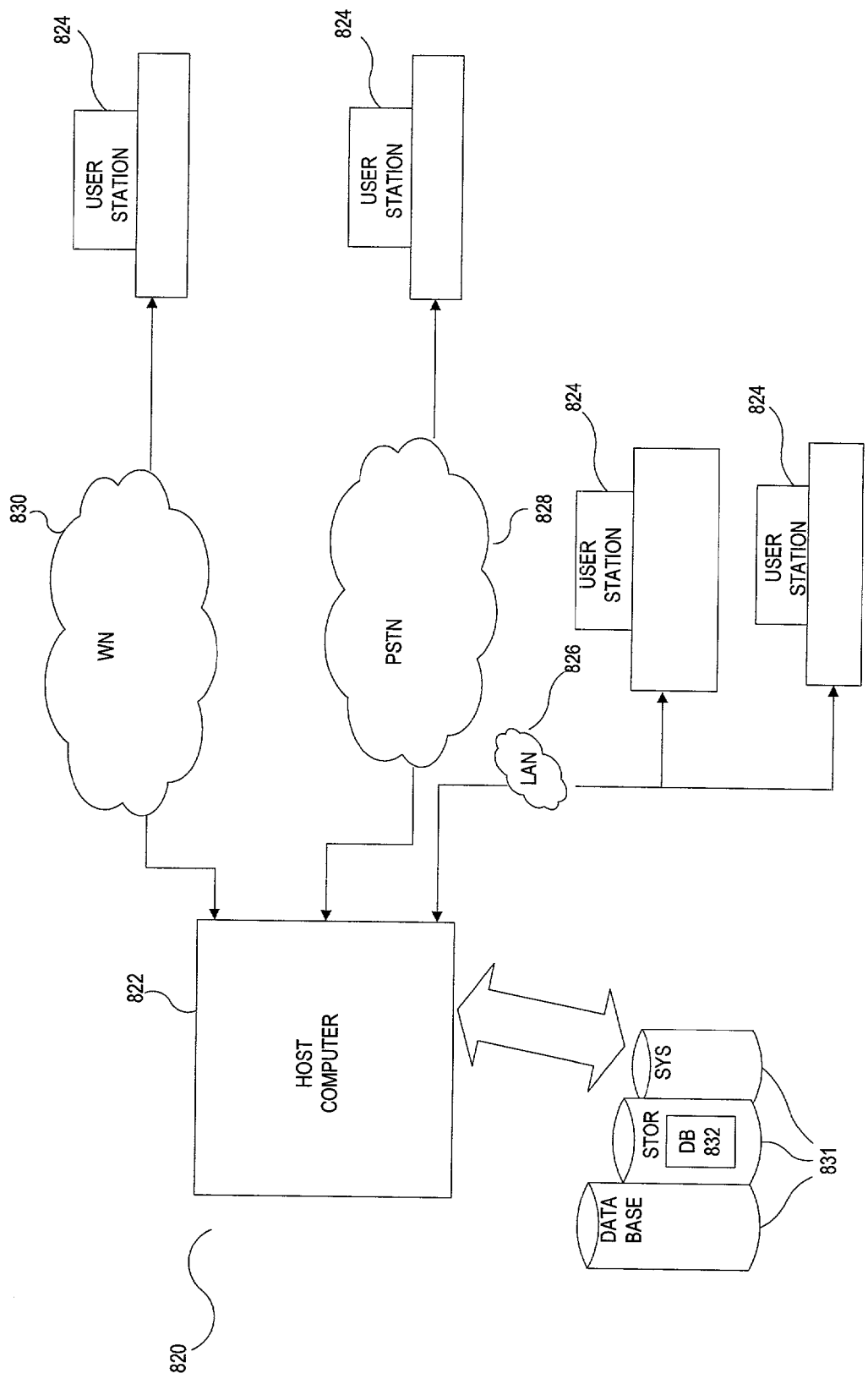
FIGS. 8 and 9 are system architectures that may be employed in an embodiment of the invention.

Referring to FIG. 8, in an embodiment, a computer system 820 includes a host computer 822 connected to a plurality of individual user stations 824. In an embodiment, the user stations 824 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 824 are connected to the host computer 822 via a local area network ("LAN") 826. Other user stations 824 are remotely connected to the host computer 822 via a public switched telephone network ("PSTN") 828 and/or a wireless network 830.

In an embodiment, the host computer 822 operates in conjunction with a data storage system 831, wherein the data storage system 831 contains a database 832 that is readily accessible by the host computer 822. Note that a multiple tier architecture can be employed to connect user stations 824 to a database 832, utilizing for example, a middle application tier (not shown). In alternative embodiments, the database 832 may be resident on the host computer, stored, e.g., in the host computer's ROM, PROM, EPROM, or any other memory chip, and/or its hard disk. In yet alternative embodiments, the database 832 may be read by the host computer 822 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 822 can access two or more databases 832, stored in a variety of mediums, as previously discussed.

Figure 9:
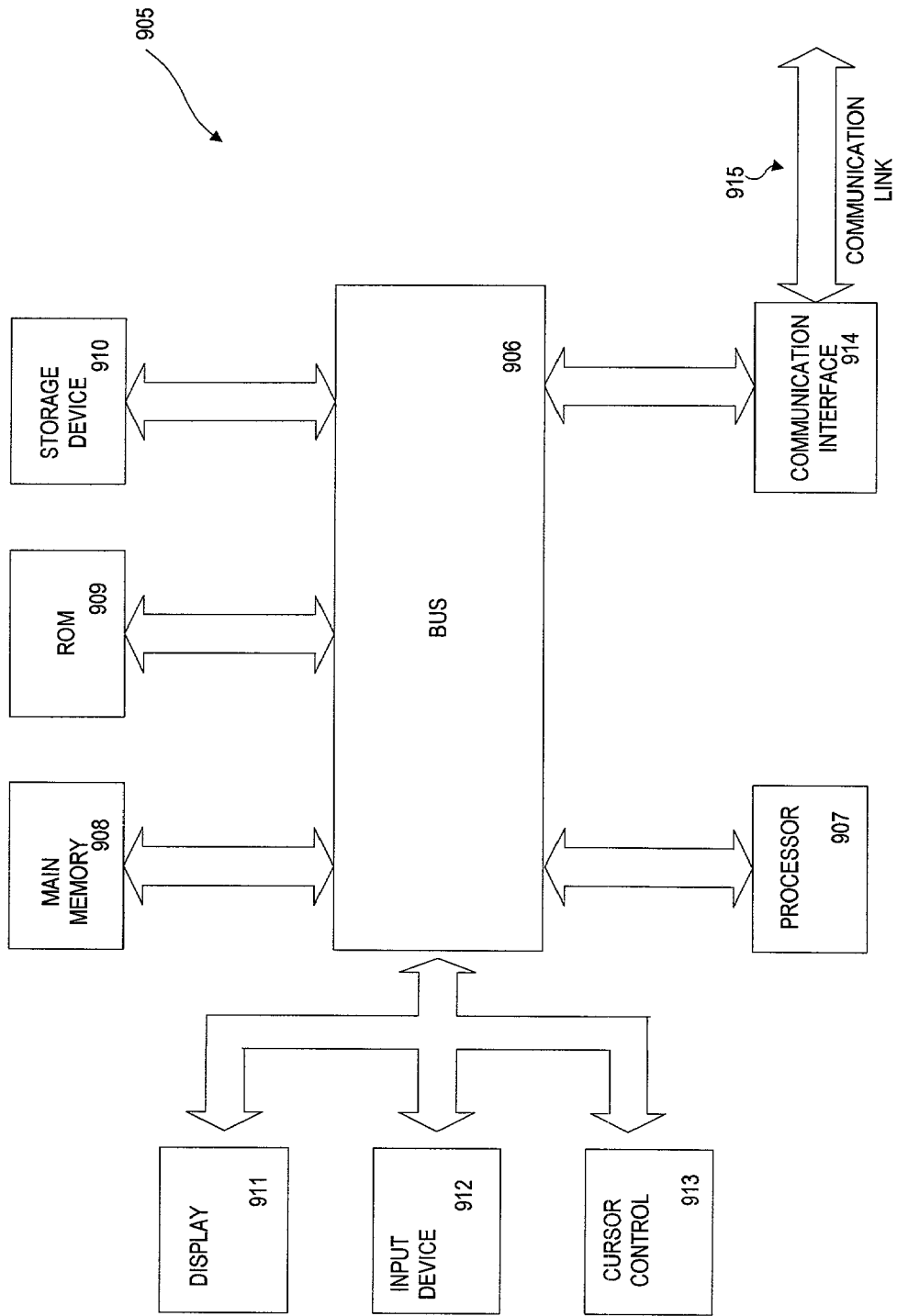

Referring to FIG. 9, in an embodiment, each user station 924 and the host computer 922, each referred to generally as a processing unit, embodies a general architecture 905. A processing unit includes a bus 906 or other communication mechanism for communicating instructions, messages and data, collectively, information, and one or more processors 907 coupled with the bus 906 for processing information. A processing unit also includes a main memory 908, such as a random access memory (RAM) or other dynamic storage device, coupled to the bus 906 for storing dynamic data and instructions to be executed by the processor(s) 907. The main memory 908 also may be used for storing temporary data, i.e., variables, or other intermediate information during execution of instructions by the processor(s) 907. A processing unit may further include a read only memory (ROM) 909 or other static storage device coupled to the bus 906 for storing static data and instructions for the processor(s) 907. A storage device 910, such as a magnetic disk or optical disk, may also be provided and coupled to the bus 906 for storing data and instructions for the processor(s) 907.

A processing unit may be coupled via the bus 906 to a display device 911, such as, but not limited to, a cathode ray tube (CRT), for displaying information to a user. An input device 912, including alphanumeric and other columns, is coupled to the bus 906 for communicating information and command selections to the processor(s) 907. Another type of user input device may include a cursor control 913, such as, but not limited to, a mouse, a trackball, a fingerpad, or cursor direction columns, for communicating direction information and command selections to the processor(s) 907 and for controlling cursor movement on the display 911.

According to one embodiment of the invention, the individual processing units perform specific operations by their respective processor(s) 907 executing one or more sequences of one or more instructions contained in the main memory 908. Such instructions may be read into the main memory 908 from another computer-usable medium, such as the ROM 909 or the storage device 910. Execution of the sequences of instructions contained in the main memory 908 causes the processor(s) 907 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 907. Such a medium may take many forms, including, but not limited to, non-volatile, volatile and transmission media. Non-volatile media, i.e., media that can retain information in the absence of power, includes the ROM 909. Volatile media, i.e., media that can not retain information in the absence of power, includes the main memory 908. Transmission media includes coaxial cables, copper wire and fiber optics, including the wires that comprise the bus 906. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 907 can retrieve information. Various forms of computer-usable media may be involved in providing one or more sequences of one or more instructions to the processor(s) 907 for execution. The instructions received by the main memory 908 may optionally be stored on the storage device 910, either before or after their execution by the processor(s) 907.

Each processing unit may also include a communication interface 914 coupled to the bus 906. The communication interface 914 provides two-way communication between the respective user stations 924 and the host computer 922. The communication interface 914 of a respective processing unit transmits and receives electrical, electromagnetic or optical signals that include data streams representing various types of information, including instructions, messages and data. A communication link 915 links a respective user station 924 and a host computer 922. The communication link 915 may be a LAN 926, in which case the communication interface 914 may be a LAN card. Alternatively, the communication link 915 may be a PSTN 928, in which case the communication interface 914 may be an integrated services digital network (ISDN) card or a modem. Also, as a further alternative, the communication link 915 may be a wireless network 930. A processing unit may transmit and receive messages, data, and instructions, including program, i.e., application, code, through its respective communication link 915 and communication interface 914. Received program code may be executed by the respective processor(s) 907 as it is received, and/or stored in the storage device 910, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A method for linking between nodes in a distributed computing system, the method comprising:
    implementing a domain comprising a first network node and a second network node;
    implementing a data object that indicates, before a link is established between the first and second network nodes, whether the domain permits the link between the first and second network nodes without verification of user credentials;
    sending a link request from the first network node to the second network node; and
    establishing the link between the first network node and the second network node without requiring the user credentials if the data object indicates that verification of the user credentials is not required.

2. The method of claim 1 in which a connected user makes the link request, and the link is established as a connected user.

3. The method of claim 1 in which a connected user makes the link request as a current user, and the link is established as a current user.

4. The method of claim 3 in which the link request is embedded in a stored object.

5. The method of claim 4 in which the stored object is selected from the list consisting of: a procedure, a function, a view, a trigger.

6. The method of claim 1 in which the second network node comprises a list of untrusted nodes, wherein the link between the first network node and the second network node is not established if the list of untrusted nodes indicates that the first network node is untrusted.

7. The method of claim 1 in which the data object that indicates whether the domain permits links between nodes without verification of user credentials is a flag in a domain object corresponding to the domain.

8. The method of claim 1 further comprising a second domain having a third network node, in which a second link request is sent from the first network node to the third network node, wherein an act of establishing a network link between the first network node and the third network is made only upon verification of user credentials.

9. The method of claim 1 further comprising a second domain having a third network node, in which a second link request is sent from the first network node to the third network node, wherein an act of establishing a network link between the first network node and the third network is made without verification of user credentials.

10. The method of claim 1 in which mutual authentication occurs between the first network node and the second network node.

11. The method of claim 1 in which the first network node passes information to the second network node regarding a prior chain of links related to the link request.

12. The method of claim 11 in which the information regarding the prior chain of links comprises identification of all previous users in the prior chain of links.

13. The method of claim 11 in which the information regarding the prior chain of links comprises identification of previous nodes in prior related links.

14. The method of claim 11 in which a last entry in the information is checked for an untrusted user/node combination.

15. The method of claim 14 in which trusted user/node combinations are maintained at a central authority.

16. The method of claim 15 in which the central authority is the directory.

17. The method of claim 14 in which untrusted combinations are stored in a database.

18. The method of claim 1 further comprising:
    establishing the link between the first network node and the second network node only upon verification of the user credentials if the data object indicates that user credentials are required.

19. A computer program product that includes a medium usable by a processor, the medium having stored thereon a sequence of instructions which, when executed by said processor, causes said processor to execute a process for linking between nodes in a distributed computing system, the process comprising:
    implementing a domain comprising a first network node and a second network node;
    implementing a data object that indicates, before a link is established between the first and second network nodes, whether the domain permits the link between the first and the second network nodes without verification of user credentials;
    sending a link request from the first network node to the second network node; and
    establishing the link between the first network node and the second network node without requiring the user credentials if the data object indicates that verification of the user credentials is not required.

20. The computer program product of claim 19 in which a connected user makes the link request, and the link is established as a connected user.

21. The computer program product of claim 19 in which a connected user makes the link request as a current user, and the link is established as a current user.

22. The computer program product of claim 21 in which the link request is embedded in a stored object.

23. The computer program product of claim 22 in which the stored object is selected from the list consisting of: a procedure, a function, a view, a trigger.

24. The computer program product of claim 19 in which the second network node comprises a list of untrusted nodes, wherein the link between the first network node and the second network node is not established if the list of untrusted nodes indicates that the first network node is untrusted.

25. The computer program product of claim 19 in which the data object that indicates whether the domain permits links between nodes without verification of user credentials is a flag in a domain object corresponding to the domain.

26. The computer program product of claim 19 further comprising a second domain having a third network node, in which a second link request is sent from the first network node to the third network node, wherein an act of establishing a network link between the first network node and the third network is made only upon verification of user credentials.

27. The computer program product of claim 19 further comprising a second domain having a third network node, in which a second link request is sent from the first network node to the third network node, wherein an act of establishing a network link between the first network node and the third network is made without verification of user credentials.

28. The computer program product of claim 19 in which mutual authentication occurs between the first network node and the second network node.

29. The computer program product of claim 19 in which the first network node passes information to the second network node regarding a prior chain of links related to the link request.

30. The computer program product of claim 29 in which the information regarding the prior chain of links comprises identification of all previous users in the prior chain of links.

31. The computer program product of claim 29 in which the information regarding the prior chain of links comprises identification of previous nodes in prior related links.

32. The computer program product of claim 29 in which a last entry in the information is checked for an untrusted user/node combination.

33. The computer program product of claim 32 in which trusted user/node combinations are maintained at a central authority.

34. The computer program product of claim 33 in which the central authority is the directory.

35. The computer program product of claim 33 in which untrusted combinations are stored in a database.

36. The computer program product of claim 19 further comprising:

establishing the link between the first network node and the second network node only upon verification of the user credentials if the data object indicates that user credentials are required.

37. A system of networked nodes in a distributed system, comprising:

a domain;

a first network node associated with the domain;

a second network node associated with the domain; and a data object associated with the domain, the data object indicating, before a link is established between the first network node and the second network node, whether a link can be established between the first network node and the second network node without verification of user credentials.

38. The system of claim 37 in which the link is requested by a connected user, and the link is established as a connected user.

39. The system of claim 37 in which the link is requested by a connected user, and the link is established as a current user.

40. The system of claim 37 further comprising a link request embedded in a stored object.

41. The system of claim 40 in which the stored object is selected from the list consisting of: a procedure, a function, a view, a trigger.

42. The system of claim 37 in which the second network node comprises a list of untrusted nodes, wherein the link between the first network node and the second network node is established only upon verification of the user credentials if the list of untrusted nodes indicates that the first network node is untrusted.

43. The system of claim 37 in which the data object that indicates whether the domain permits links between nodes without verification of user credentials is a flag in a domain object corresponding to the domain.

44. The system of claim 37 in which mutual authentication occurs between the first network node and the second network node.

45. The system of claim 37 in which the first network node passes information to the second network node regarding a prior chain of links related to the link request.

46. The system of claim 45 in which the information regarding the prior chain of links comprises identification of all previous users in the prior chain of links.

47. The system of claim 45 in which the information regarding the prior chain of links comprises identification of previous nodes in prior related links.

48. The system of claim 45 in which a last entry in the information is checked for an untrusted user/node combination.

49. The system of claim 48 in which trusted user/node combinations are maintained at a central authority.

50. The system of claim 49 in which the central authority is the directory.

* * * * *